US012669681B2

(12) United States Patent
Ishida et al.

(10) Patent No.: US 12,669,681 B2
(45) Date of Patent: Jun. 30, 2026

(54) OPTICAL SYSTEM AND DISPLAY APPARATUS

(71) Applicant: CANON KABUSHIKI KAISHA, Tokyo (JP)

(72) Inventors: Kazuto Ishida, Tochigi (JP); Yu Miyajima, Tochigi (JP); Keigo Yarita, Tokyo (JP); Yuma Kobayashi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 18/545,999

(22) Filed: Dec. 19, 2023

(65) Prior Publication Data

US 2024/0255734 A1 Aug. 1, 2024

(30) Foreign Application Priority Data

Jan. 24, 2023 (JP) ................................. 2023-008489

(51) Int. Cl.
| | | |
|---|---|---|
| *G02B 13/00* | (2006.01) | |
| *G02B 13/18* | (2006.01) | |
| *G02B 17/08* | (2006.01) | |
| *G02B 25/00* | (2006.01) | |
| *G02B 27/00* | (2006.01) | |
| *G02B 27/01* | (2006.01) | |

(52) U.S. Cl.
CPC ........... *G02B 13/002* (2013.01); *G02B 13/18* (2013.01); *G02B 17/0856* (2013.01); *G02B 27/0172* (2013.01); *G02B 25/001* (2013.01); *G02B 27/0025* (2013.01)

(58) Field of Classification Search
CPC .. G02B 13/002; G02B 13/18; G02B 17/0856; G02B 27/0172; G02B 25/001; G02B 27/0025
USPC ......................................................... 359/676
See application file for complete search history.

(56) References Cited

U.S. PATENT DOCUMENTS

| | | | | |
|---|---|---|---|---|
| 5,517,366 A * | 5/1996 | Togino | ............... | G02B 17/0804 |
| | | | | 359/728 |
| 5,644,436 A * | 7/1997 | Togino | ................... | G02B 13/18 |
| | | | | 359/730 |
| 6,480,338 B1 * | 11/2002 | Ohzawa | ............... | G02B 25/001 |
| | | | | 359/727 |
| 2021/0286183 A1 * | 9/2021 | Ouderkirk | .......... | G02B 27/0068 |
| 2023/0148263 A1 * | 5/2023 | Yun | ..................... | G02B 27/0172 |
| | | | | 359/485.01 |
| 2024/0210700 A1 * | 6/2024 | Miyajima | .......... | G02B 27/4211 |

FOREIGN PATENT DOCUMENTS

JP 7085559 B2 6/2022

* cited by examiner

*Primary Examiner* — Sharrief I Broome

(74) *Attorney, Agent, or Firm* — Canon U.S.A., Inc. IP Division

(57) ABSTRACT

An optical system includes, in order from a pupil surface to a display surface, a front group having a first lens with positive refractive power, and a rear group having multiple lenses. The rear group includes a first transmissive reflective surface nearest the pupil surface and a second transmissive reflective surface nearest the display surface. The optical system satisfies a predetermined inequality to improve optical performance.

17 Claims, 10 Drawing Sheets d-line        △S
f-line        △M        d-line        f-line

EPD = 4.0          ω = 50 °          ω = 50 °          ω = 50 °

-0.500    0.500  -0.500    0.500  -40.000    40.000  -0.060    0.060
SPHERICAL          ASTIGMATISM          DISTORTION          CHROMATIC
ABERRATION                                    (%)          ABERRATION

—————— d-line        —————— ΔS
— · — · — f-line        — — — — ΔM        —————— d-line        — · — · — f-line

EPD = 4.0        ω= 50°        ω= 50°        ω= 50°

-0.500    0.500    -0.500    0.500    -40.000    40.000    -0.060    0.060

SPHERICAL        ASTIGMATISM        DISTORTION        CHROMATIC
ABERRATION                                (%)        ABERRATION

——— d-line     ——— ΔS
—·—·— f-line     ------ ΔM     ——— d-line     —·—·— f-line

EPD = 4.0     ω= 50°     ω= 50°     ω= 50°

- 0.500     0.500    - 0.500     0.500    - 40.000     40.000    - 0.060     0.060
SPHERICAL
ABERRATION

ASTIGMATISM

DISTORTION
(%)

CHROMATIC
ABERRATION

OPTICAL SYSTEM AND DISPLAY APPARATUS

BACKGROUND

Technical Field

One of the aspects of the embodiments relates to an optical system and a display apparatus (observation apparatus).

Description of Related Art

The conventional display apparatus such as a head mount display (HMD) provides a realistic experience by enlarging an original image displayed using an image display element through an observation optical system and enabling the user to view it. Since this type of display apparatus is worn on the user's head, the observation optical system is demanded to have a wide field of view, high optical performance, and a small (thin) size. Japanese Patent No. 708559 discloses an observation optical system using a reflective surface.

The optical system disclosed in Japanese Patent No. 7085559 has a lens surface that is closest to the observation surface and has a concave shape, and thus an outer periphery of a lens having this lens surface protrudes toward the observation side. Therefore, even if sufficient eye relief can be secured at the center portion of this lens, it becomes difficult to secure sufficient eye relief at the outer periphery.

SUMMARY

An optical system according to one aspect of the disclosure is configured to guide a light beam from a display surface to a pupil surface. The optical system includes, in order from a pupil surface side to a display surface side, a front group having a first lens having positive refractive power, and a rear group having a plurality of lenses. A surface closest to the pupil surface of the rear group is a first transmissive reflective surface, and a surface closest to the display surface of the rear group is a second transmissive reflective surface. The following inequality is satisfied:

$$-0.10 < SagR1LF/F < 0.20,$$

where SagR1LF is a maximum sag amount of a surface on the pupil surface side of the first lens, and F is a focal length of the optical system. A display apparatus having the above optical system also constitutes another aspect of the disclosure.

Further features of various embodiments of the disclosure will become apparent from the following description of embodiments with reference to the attached drawings.

DESCRIPTION OF THE EMBODIMENTS

Referring now to the accompanying drawings, a description will be given of examples.

Figure 19:
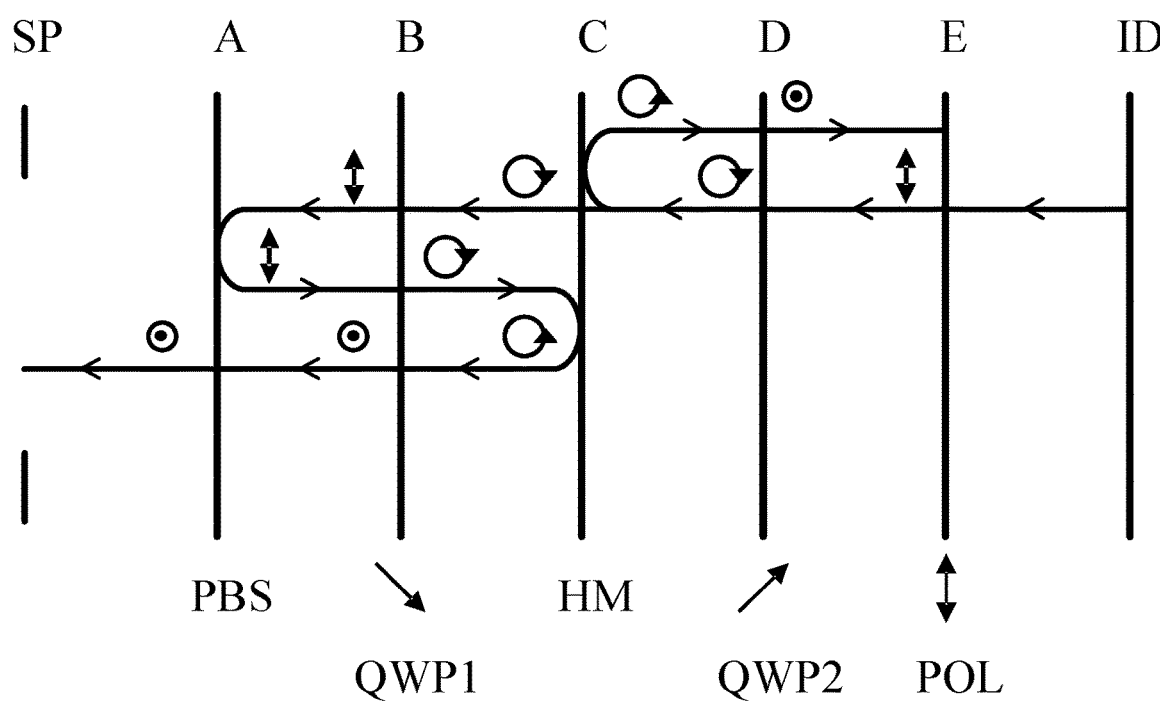
FIG. 19 explains an optical path of the optical system utilizing polarization according to each example.
Figure 20:
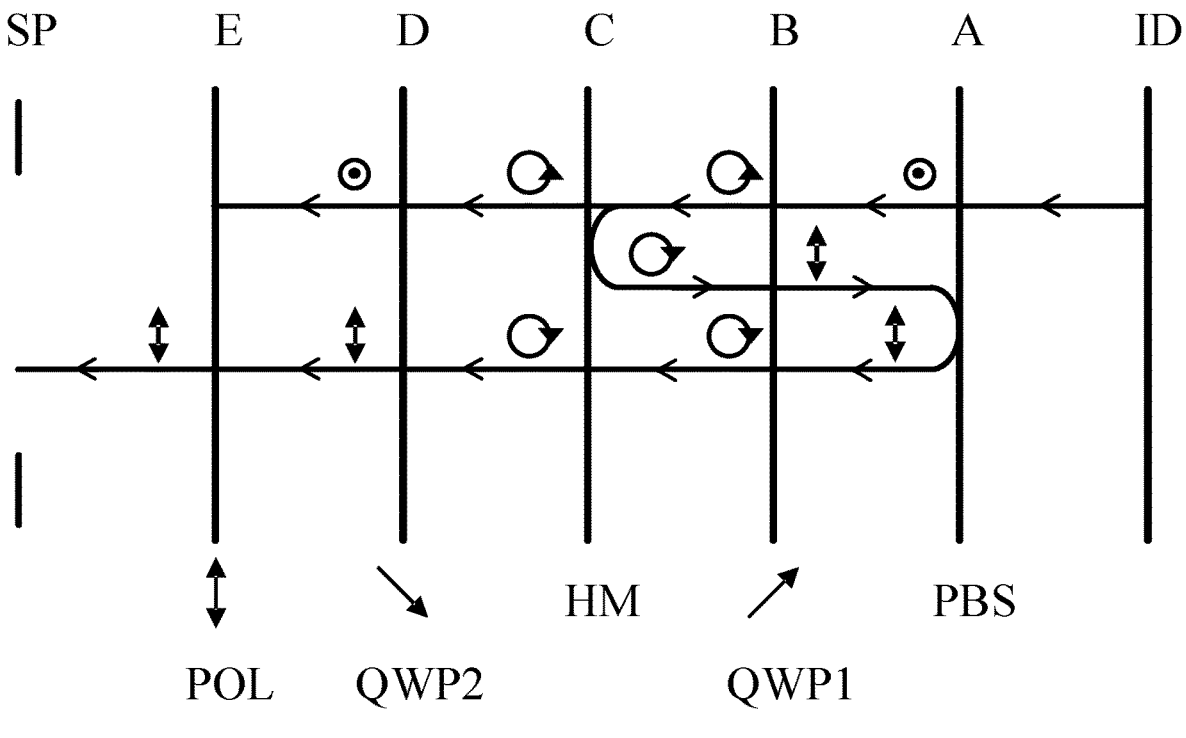
FIG. 20 explains an optical path of the optical system utilizing polarization according to each example.

FIGS. 1, 3, 5, 7, 9, 11, 13, 15, and 17 are sectional views of optical systems 1a to 1i according to Examples 1 to 9, respectively. FIGS. 2, 4, 6, 8, 10, 12, 14, 16, and 18 are longitudinal aberration diagrams of the optical systems 1a to 1i, respectively (pupil diameter of φ4 mm, eye relief of 12 mm, and diopter of −0.625 diopter). FIGS. 19 and 20 explain optical paths of an optical system utilizing polarization.

In each sectional view, the eye relief represents a distance between the eye point on the optical axis and the lens surface closest to the observation surface. In evaluating aberrations, the aberration of a light ray that reaches the observation surface with a light emitting point provided on the display surface ID side and the aberration of a light ray that reaches the display surface with a light emitting point provided on the observation surface side are one-to-one correspondence and thus aberrations on the display surface are evaluated for convenience. Since the human pupil diameter is approximately φ4 mm, for example, the longitudinal aberration diagram is illustrated at a position where the eye relief is representatively 12 mm by assuming that the pupil diameter (EPD) is φ4 mm.

The optical system according to each example is an optical system configured to guide a light beam from a display surface ID of a display element (display panel) to a pupil surface SP, and is an observation optical system configured to enable the user to observe an image displayed on the display surface ID. A display apparatus includes the optical system according to each example and a display element. The optical system according to each example includes, in order from the observation side (pupil surface SP side) to the display screen ID side, a pupil surface SP, a first lens G1 having positive refractive power, an air gap, a second lens G2 having negative refractive power, and a third lens G3 having positive refractive power. A surface on the observation side of the second lens G2 is a first transmissive reflective surface HM1. A surface on the display surface side of the third lens G3 is a second transmissive reflective surface HM2.

A front group LF includes the first lens (front group first lens) G1. A rear group LR includes a second lens (rear group first lens) G2 and a third lens (rear group second lens) G3 (a unit disposed between the first transmissive reflective surface HM1 and the second transmissive reflective surface HM2). That is, in the rear group LR, the surface closest to the pupil surface is the first transmissive reflective surface HM1, and in the rear group LR, the surface closest to the display surface is the second transmissive reflective surface HM2. Thus, in the optical system according to each example, only the rear group LR has the transmissive reflective surfaces. A display element, such as an LCD (Liquid Crystal Display), is disposed on the display screen ID. The pupil surface SP is an observation surface, where the observer's pupil is located. A light amount diaphragm (aperture stop) may be disposed on the pupil surface SP.

A description will now be given of the role of each component in the optical system according to each example. The second transmissive reflective surface HM2 has strong positive refractive power and significantly contributes to the overall power of the optical system. The second transmissive reflective surface HM2 having strong positive refractive power generates a strong curvature of field, so the first transmissive reflective surface HM1 of the paired observation surface side has a surface having negative refractive power and corrects the curvature of field. The negative lens G2 having the first transmissive reflective surface HM1 has a role of correcting lateral chromatic aberration with negative refractive power in addition to correcting curvature of field, and has a predetermined Abbe number suitable to correct chromatic aberration.

A so-called triple-pass configuration is adopted in which the optical path passes three times between the first transmissive reflective surface HM1 and the second transmissive reflective surface HM2. At the interface between the second lens G2 and the third lens G3, sandwiched between the first transmissive reflective surface HM1 and the second transmissive reflective surface HM2, the optical path reciprocates three times through the close interface area, so the sensitivity to various aberrations such as coma is high. Thus, if there is an air layer (air gap or distance) between the second lens G2 and the third lens G3, large coma occurs on the lens surface. In order to avoid this problem, the second lens G2 and the third lens G3 are joined together so that no air layer exists between them (the second lens G2 and the third lens G3 are cemented together). An optical member serving as a quarter waveplate, which will be described below, can be placed, joined, and sandwiched between the second lens G2 and the third lens G3.

The front group LF is disposed on the observation side off the optical path sandwiched between the first transmissive reflective surface HM1 and the second transmissive reflective surface HM2 of the rear group LR. Since the front group LF has positive refractive power, it further intensifies the positive refractive power of the rear group LR and contributes to widening a viewing angle of the entire optical system. Distributing the power to the front group LF in a well-balanced manner can prevent the positive refractive power of the rear group LR from becoming too strong, and provide the effect of correcting the curvature of field of the entire optical system. In addition to these correction effects, the front group LF has a high degree of freedom in shape because it is disposed independently of the triple-pass configuration of the rear group LR. The front group LF is separated from the rear group LR. Strong aspheric shape correction can be performed on the display surface side of the first lens G1, which is difficult to place due to its high sensitivity in the triple-pass configuration, and the curvature of field can be satisfactorily corrected.

The surface shape on the observation surface side of the first lens G1 influences the substantial length of the eye relief. In definition, the eye relief can be expressed as the distance between the eye point on the optical axis and the lens surface closest to the observation surface. In a case where the surface shape on the observation surface side of the first lens G1 is a shape that protrudes from the optical axis to the periphery, the actual eye relief is a distance from the most protruding position to the eye point. Thus, in securing a substantially long eyepoint, the surface shape on the observation surface side of the first lens G1 is restricted. Nevertheless, the first lens G1 is separated from the triple-pass configuration, and thus there is a high degree of freedom in lens shape, and it is easy to secure substantial eye relief. This configuration can realize an optical system that has a wide field of view and high optical performance and can easily ensure eye relief.

In the optical system according to each example, a polarization-selective transmissive reflective element can be used as at least one of the first transmissive reflective surface HM1 or the second transmissive reflective surface HM2. In a case where only one of the first transmissive reflective surface HM1 and the second transmissive reflective surface HM2 is used as a polarization-selective transmissive reflective element, an optical element in which metal or dielectric material is formed in a line or band shape on a fine one-dimensional grating integrally molded with each lens. This configuration eliminates the need to separately prepare the lens and the transmissive reflective surface, and can be manufactured at low cost. In this case, image quality deterioration caused by minute distortions that occur in attaching the film to the lens surface can be prevented. Aluminum can be used as the metal formed into a line or band shape, for example. Such a polarization-selective transmissive reflective element can be considered to be a type of wire grid polarizer. The element form of the wire grid is not limited, and various element forms can be used as long as it functions as a polarization-selective transmissive reflective element.

In the optical system according to each example, the following inequality (1) is satisfied:

$$-0.10 < SagR1LF/F < 0.20, \tag{1}$$

where SagR1LF is a maximum sag amount of the surface on the pupil surface side (observation surface side) of the first lens G1, and F is a focal length of the optical system (the entire system).

Inequality (1) defines a ratio between the maximum sag amount a surface on the observation surface side of the first lens G1 and the focal length of the optical system. Satisfying inequality (1) can realize an optical system with excellent visibility during observation due to the long eye relief and excellent aberration performance. In a case where the value becomes lower than the lower limit of inequality (1), a protrusion amount of the lens surface toward the observation side is large enough to substantially erode the eye relief, and the eye relief becomes short. On the other hand, in a case where the value becomes higher than the upper limit of inequality (1), the refractive power of the curved surface relative to a light ray at a peripheral image height increases, the tilt of the image plane increases, and thus the curvature of field increases. The maximum sag amount sagR1LF is a maximum displacement amount (unit: mm) of the surface of the first lens G1 in the optical axis direction from the lens vertex in an area within the effective diameter. The displacement toward the observation surface side is negative, and the displacement toward the display surface side is positive.

Inequality (1) may be replaced with inequality (1a) below:

$$-0.08 < SagR1LF/F < 0.19. \tag{1a}$$

Inequality (1) may be replaced with inequality (1b) below:

$$-0.05 < SagR1LF/F < 0.18. \tag{1b}$$

Ef is a focal length of the front group LF, Fr is a focal length of the rear group LR, Fr1 is a focal length of the second lens G2, and Fr2 is a focal length of the third lens G3. R1LR is a curvature of a surface closest to the observation surface of rear group LR, R2LR is a curvature of a surface closest to the display surface side of rear group LR, Vd1LR is an Abbe number of the second lens G2 based on the d-line, and Vd2LR is an Abbe number of the third lens G3 based on the d-line. Then, the optical system according to each example may satisfy at least one of the following inequalities (2) to (9):

$$2.0 < Ff/F < 7.0; \tag{2}$$
$$-14.0 < Fr1/F < -5.0; \tag{3}$$
$$1.2 < Ff/Fr < 6.5; \tag{4}$$
$$1.00 < Fr/F < 2.00; \tag{5}$$
$$-3 < Fr1/Fr2 < -1.5; \tag{6}$$
$$4.0 < Fr2/F < 6.0; \tag{7}$$
$$0.10 < (R1LR - R2LR)/(R1LR + R2LR) < 1.00; \text{ and} \tag{8}$$
$$Vd1LR < Vd2LR. \tag{9}$$

Inequality (2) defines a ratio between the focal length of the front group LF and the focal length of the entire optical system. Satisfying inequality (2) can properly set the focal length of the first lens G1, and realize an optical system having a wide viewing angle and excellent aberration performance. In a case where the value becomes lower than the lower limit of inequality (2), the refractive power of the second lens G2 becomes too large, the image plane tilts, coma increase, and the optical performance lowers. On the other hand, in a case where the value becomes higher than the upper limit of inequality (2), the refractive power of the first lens G1 becomes weaker, the effect of enlarging the refractive power of the rear group LR becomes smaller, and it becomes difficult to widen the viewing angle.

Inequality (3) defines a ratio of the focal length of the second lens G2 and the focal length of the entire optical system. Satisfying inequality (3) can properly set the focal length of the second lens G2, and realize an optical system in which lateral chromatic aberration and curvature of field are satisfactorily corrected. In a case where the value becomes lower than the lower limit of inequality (3), the negative refractive power of the second lens G2 becomes large, and the lateral chromatic aberration and curvature of field become excessively corrected. On the other hand, in a case where the value becomes higher than the upper limit of inequality (2), the negative refractive power of the second lens G2 becomes small, and the lateral chromatic aberration and curvature of field become insufficiently corrected.

Inequality (4) defines a ratio between the focal length of the front group LF and the focal length of the rear group LR. Satisfying inequality (4) can properly set the ratio between the focal length (refractive power) of the front group LF and the focal length (refractive power) of the rear group LR, and realize an optical system with excellent aberration performance. In a case where the value becomes lower than the lower limit of inequality (4), the refractive power of the front group LF becomes too strong relative to the refractive power of the rear group LR, the refractive power of the rear group LR becomes weak, and astigmatism and coma due to the triple-pass configuration cannot be satisfactorily corrected. On the other hand, in a case where the value becomes higher than the upper limit of inequality (4), the refractive power of the front group LF becomes too weak relative to the refractive power of the rear group LR, and the effect of improving the wide viewing angle by the front group LF becomes weaker.

Inequality (5) defines a ratio of the focal length of the rear group LR to the focal length of the entire optical system. Satisfying inequality (5) can properly set the focal length of the rear group LR, and realize an optical system with excellent aberration performance. In a case where the value becomes lower than the lower limit of inequality (5), the refractive power of the focal length of rear group LR becomes too large. On the other hand, in a case where the value becomes higher than the upper limit of inequality (5), the refractive power of the focal length of the rear group LR becomes too weak, and it becomes difficult to satisfactorily correct astigmatism and coma caused by the triple-pass configuration.

Inequality (6) defines a ratio between the focal length of the second lens G2 and the focal length of the third lens G3. Satisfying inequality (6) can properly set the ratio between the focal length of the second lens G2 and the focal length of the third lens G3, and realize an optical system in which lateral chromatic aberration is satisfactorily corrected. In a case where the value becomes lower than the lower limit of inequality (6), the negative refractive power of the second lens G2 becomes weaker, and the effect of correcting lateral chromatic aberration becomes weaker. On the other hand, in a case where the value becomes higher than the upper limit of inequality (6), the negative refractive power of the second lens G2 becomes too strong, and the lateral chromatic aberration becomes excessively corrected.

Inequality (7) defines a ratio between the focal length of the third lens G3 and the focal length of the entire optical system. Satisfying inequality (7) can properly set the focal length of the third lens G3, and realize an optical system having a wide viewing angle and excellent aberration performance. In a case where the value becomes lower than the lower limit of inequality (7), the refractive power of the third lens G3 becomes too strong, and curvature of field, astigmatism, coma, etc. increase. In a case where the value becomes higher than the upper limit of inequality (7), the refractive power of the third lens G3 becomes weaker, the overall refractive power becomes weaker, and it becomes difficult to achieve a wide angle of view.

Inequality (8) defines a shape factor of the curvature of the surface closest to the observation surface of the rear group LR and the curvature of the surface closest to the display surface of rear group LR. Satisfying inequality (8) can provide the first transmissive reflective surface HM1 and the second transmissive reflective surface HM2 with good shapes, and realize an optical system in which lateral chromatic aberration is satisfactorily corrected. In a case where the value becomes lower than the lower limit of inequality (8), the curvature of the first transmissive reflective surface HM1 becomes steeper than that of the second transmissive reflective surface HM2, astigmatism and coma are excessively corrected, and image performance is lowered. On the other hand, in a case where the value becomes higher than the upper limit of inequality (8), the curvature of the second transmissive reflective surface HM2 becomes steeper than that of the first transmissive reflective surface HM1, and astigmatism and coma become insufficient, and sufficient image performance cannot be obtained.

Inequality (9) defines the Abbe number of the second lens G2 and the Abbe number of the third lens G3. Satisfying inequality (9) can satisfactorily correct lateral chromatic aberration, and realize an optical system with less color blur. In a case where inequality (9) is not satisfied, a lateral chromatic aberration amount generated by the second lens having positive refractive power in the rear group becomes larger than a lateral chromatic aberration amount generated by the first lens having negative refractive power in the rear group, and a color blur amount in the optical system increases.

Inequalities (2) to (8) may be replaced with inequalities (2a) to (8a) below:

$$2.1 < Ff/F < 6.9; \tag{2a}$$

$$-13.8 < Fr1/F < -7.0; \tag{3a}$$

$$1.3 < Ff/Fr < 6.4; \tag{4a}$$

$$1.04 < Fr/F < 1.80; \tag{5a}$$

$$-2.8 < Fr1/Fr2 < -1.7; \tag{6a}$$

$$4.2 < Fr2/F < 6.0; \text{ and} \tag{7a}$$

$$0.25 < (R1LR - R2LR)/(R1LR + R2LR) < 0.80. \tag{8a}$$

Inequalities (2) to (8) may be replaced with inequalities (2b) to (8b) below:

$$2.3 < Ff/F < 6.8; \tag{2b}$$

$$-13.6 < Fr1/F < -9.5; \tag{3b}$$

$$1.5 < Ff/Fr < 6.2; \tag{4b}$$

$$1.09 < Fr/F < 1.50; \tag{5b}$$

$$-2.5 < Fr1/Fr2 < -1.9; \tag{6b}$$

$$4.5 < Fr2/F < 5.9; \text{ and} \tag{7b}$$

$$0.39 < (R1LR - R2LR)/(R1LR + R2LR) < 0.51. \tag{8b}$$

In the optical system according to each example, only one of the first transmissive reflective surface and the second transmissive reflective surface may be a polarization-selective transmissive reflective element (reflective polarizer). The reflective polarizer may include a plurality of protrusion portions made of metal or dielectric (linear or band-shaped protrusions), and the array pitch of the plurality of protrusion portions may be 200 nm or less.

The optical system according to each example adopts the following configuration 1 or 2 to suppress a drop in the light intensity of the regular observation optical path and to reduce ghosts light (unnecessary light leakage) from the optical path that passes through the transmissive reflective surface without being reflected even once.

Configuration 1 Utilizing Polarization

Referring now to FIG. 19, a description will be given of a configuration utilizing polarization. The optical system with this configuration has two transmissive reflective surfaces. Here, the transmissive reflective surface disposed on the observation side of the optical system according to this configuration includes polarization-selective transmissive reflective element (PBS) A. The polarization-selective transmissive reflective element (PBS) is a polarizer (reflective polarizer) configured to separate (split) incident light into reflected light and transmitting light according to the polarization state. The transmissive reflective surface disposed on the display element side of the optical system according to this configuration includes half-mirror (HM) C. First quarter waveplate (QWP1) B is placed between the polarization-selective transmissive reflective element PBS and the half-mirror HM. Second quarter waveplate (QWP2) D and linear polarizing plate (POL) E are disposed between the half-mirror HM and the display surface ID.

Here, the polarization-selective transmissive reflective element A is an element configured to reflect linearly polarized light polarized in the same direction as that when transmitting through the linear polarizing plate E, and transmit linearly polarized light orthogonal to this direction. The polarization-selective transmissive reflective element is, for example, a wire grid polarizer or a reflective polarizer having a layered structure of retardation films. At this time, the wire grid forming surface or the retardation film surface of the polarization-selective transmissive reflective element A functions as a transmissive reflective surface. The wire grid polarizer does not necessarily have to be made of aligned metal wires, but can be anything that has thin metal or dielectric layers at predetermined intervals and functions as a polarization-selective transmissive reflective element. For example, an element with aligned metal or dielectric layers as described above can be used.

The first quarter waveplate B and the second quarter waveplate D are arranged with their slow axes tilted by 45 degrees relative to the polarization transmission axis of the linear polarizing plate E. Here, the first quarter waveplate B and the second quarter waveplate D may be disposed with their respective slow axes tilted by 90 degrees. This arrangement can cancel out the wavelength dispersion characteristics of these waveplates in a case where a light beam transmits through the first quarter waveplate B and the second quarter waveplate D. The half-mirror C is a half-mirror formed, for example, by a dielectric multilayer film or metal vapor deposition, and functions as a transmissive reflective surface. The linear polarizing plate E is, for example, an absorption type linear polarizer.

A description will now be given of the optical path selection and operation in the configuration utilizing polarization. The light emitted from the display surface ID becomes linearly polarized light by the linear polarizing plate E, becomes circularly polarized light by the second quarter waveplate D, and enters the half-mirror C. Part of the light that reaches the half-mirror C is reflected, becomes circularly polarized light in the opposite direction, and returns to the second quarter waveplate D. The circularly polarized light in the opposite direction that has returned to the second quarter waveplate D returns to the linear polarizing plate E as linearly polarized light polarized by the second quarter waveplate D in a direction orthogonal to that when first transmitting through the linear polarizing plate E and is absorbed by the linear polarizing plate E. On the other hand, part of the light that reaches the half-mirror C transmits through the half-mirror C and becomes linearly polarized light by the first quarter waveplate B in the same direction as that when transmitting through the linear polarizing plate E, and enters the polarization-selective transmissive reflective element A.

Here, due to the polarization selectivity of the polarization-selective transmissive reflective element A, the linearly polarized light polarized in the same direction as that when transmitting through the linear polarizing plate E is reflected. The light reflected by the polarization-selective transmissive reflective element A becomes circularly polarized light in the same as that when it first became circularly polarized light by the second quarter waveplate D and the first quarter waveplate B, and enters the half-mirror C. The light reflected by the half-mirror C becomes circularly polarized light in the opposite direction to that of the pre-reflection light, enters the first quarter waveplate B, becomes linearly polarized light polarized in a direction orthogonal to that when it first transmits through the linear polarizing plate E, and enters the polarization-selective transmissive reflective element A. Here, due to the polarization selectivity of the polarization-selective transmissive reflective element A, linearly polarized light polarized in a direction orthogonal to that when transmitting through the linear polarizing plate E transmits through it and is guided to the pupil surface SP.

Due to the above actions, only the light that has transmitted through the half-mirror HM, been reflected by the polarization-selective transmissive reflective element PBS, been reflected by the half-mirror HM, and transmitted through the polarization-selective transmissive reflective element PBS is guided to the pupil surface SP.

Configuration 2 Utilizing Polarization

Referring now to FIG. 20, a description will be given of a configuration utilizing polarization. The optical system with this configuration has two transmissive reflective surfaces. Here, the transmissive reflective surface disposed on the observation side of the optical system according to this configuration includes a half-mirror (HM) C. The transmissive reflective surface disposed on the display element side of the optical system according to this configuration includes a polarization-selective transmissive reflective element (PBS) A. A first quarter waveplate (QWP1) B is disposed between the polarization-selective transmissive reflective element PBS and the half-mirror HM. A linear polarizing plate (POL) E and a second quarter waveplate (QWP2) D are disposed between the half-mirror HM and the pupil surface SP. In this configuration, the configuration of each polarizing element and the arrangement of the optical axis direction are the same as those of configuration 1 described above.

A description will now be given of the optical path selection and operation in the configuration utilizing polarization. Due to the polarization-selective transmissive reflective element A, the light emitted from the display surface ID becomes linearly polarized light polarized in a direction orthogonal to the transmission axis of the linear polarizing plate E, and transmits through the polarization-selective transmissive reflective element A. The light that has transmitted through the polarization-selective transmissive reflective element A becomes circularly polarized light by the first quarter waveplate B, and enters the half-mirror C. Part of the light that reaches the half-mirror C transmits through it and enters the second quarter waveplate D. The circularly polarized light that has entered the second quarter waveplate D then enters the linear polarizing plate E as linearly polarized light polarized in a direction orthogonal to the transmission axis of the linear polarizing plate E by the second quarter waveplate D, and is absorbed by the linear polarizing plate E. On the other hand, part of the light that has reached the half-mirror C is reflected, becomes circularly polarized light in the opposite direction, and returns to the first quarter waveplate B. The circularly polarized light in the opposite direction that has returned to the first quarter waveplate B becomes linearly polarized light polarized in a direction parallel to the transmission axis of the linear polarizing plate E by the first quarter waveplate B, and enters the polarization-selective transmissive reflective element A.

Here, due to the polarization selectivity of the polarization-selective transmissive reflective element A, the linearly polarized light polarized in a direction parallel to the transmission axis of the linear polarizing plate E is reflected. The light reflected by the polarization-selective transmissive reflective element A becomes circularly polarized light in the opposite direction to the circularly polarized light produced by the first quarter waveplate B, and enters the half-mirror C. Here, the light that has transmitted through the half-mirror C enters the second quarter waveplate D, becomes linearly polarized light polarized in a direction parallel to the transmission axis of the linear polarizing plate E, transmits through the linear polarizing plate E, and is guided to the pupil surface SP.

Due to the above actions, only the light that has been transmitted through the polarization-selective transmissive reflective element PBS, been reflected by the half-mirror HM, been reflected by the polarization-selective transmissive reflective element PBS, and been transmitted through the half-mirror HM is guided to the pupil surface SP.

A description will now be given of the configuration of the optical system according to each example.

Example 1

Figures 1, 2:
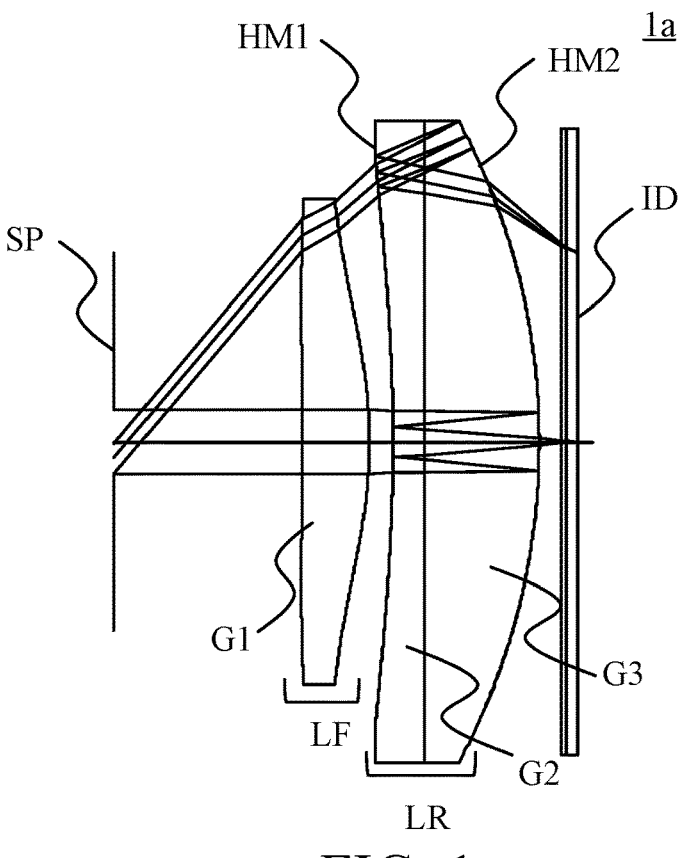
FIG. 1 is a sectional view of an optical system according to Example 1.
FIG. 2 is a longitudinal aberration diagram of the optical system according to Example 1.

Referring now to FIG. 1, a description will be given of an optical system 1a according to Example 1. The optical system 1a is an observation optical system with an overall angle of view of 100 degrees. The optical system 1a includes, in order from the observation side (pupil surface side) to the display surface side, a pupil surface SP, a front group LF having a first lens G1 having positive refractive power, and a rear group LR having a second lens G2 having negative refractive power and a third lens G3 having positive refractive power. The rear group LR has a first transmissive reflective surface HM1 on the surface on the observation side, and a second transmissive reflective surface HM2 on the surface on the display surface side.

The first lens G1 of the front group LF contributes to widening the viewing angle due to its positive refractive power, the protrusion amount of the surface on the observation surface side of the first lens G1 is small on the observation surface throughout the effective diameter range (effective area), the eye relief is not eroded, and thus a substantially long eye relief can be secured. The surface on the display surface side of the first lens G1 has an aspheric shape such that the positive refractive power becomes weaker toward the outer periphery, and thus the tilt of the curvature of field can be satisfactorily corrected. No air layer exists between the second lens G2 and the third lens G3, which are sandwiched between the first transmissive reflective surface HM1 and the second transmissive reflective surface HM2 of the rear group LR, and can prevent coma from occurring. The second lens G2 contributes to satisfactory correction of lateral chromatic aberration and a curvature of field. The third lens G3 contributes to widening the viewing angle due to its strong refractive power.

In this example, at least one of the second lens G2 and the third lens G3 having large lens outer diameters is a lens (resin lens, plastic lens) made of a resin material using injection molding. The resin lens lighter than glass material can reduce the burden on the observer in using the optical system 1a. The resin material does not need to be made exclusively of resin, and may contain impurities other than resin as long as the main material is resin. The second lens G2 and the third lens G3 have a laminated structure in which no air layer exists between them (the second lens G2 and the third lens G3 are cemented). This example can sandwich and join an optical member having a function as a quarter waveplate between the second lens G2 and the third lens G3. In addition, making the opposing surfaces (junction surfaces) of the second lens G2 and the third lens G3 flat can easily join them with an optical member that functions as a quarter waveplate.

Example 2

Figure 3:
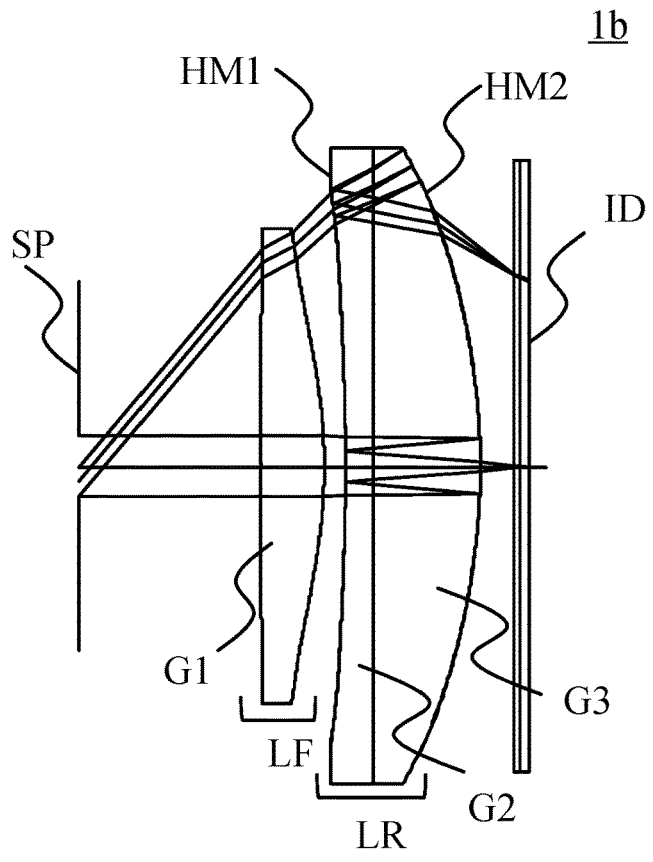
FIG. 3 is a sectional view of an optical system according to Example 2.
Figure 4:
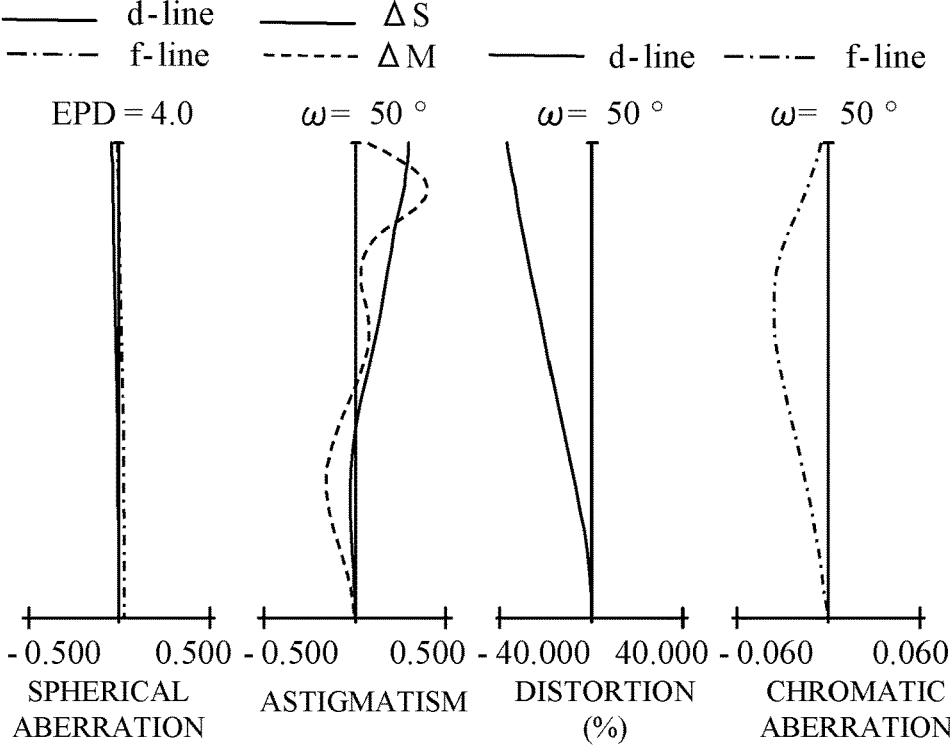
FIG. 4 is a longitudinal aberration diagram of the optical system according to Example 2.

Referring now to FIG. 3, a description will be given of an optical system 1b according to Example 2. The basic configuration of the optical system 1b is the same as that of the optical system 1a according to Example 1. In comparison with Example 1, this example changes the balance of each aberration, each lens shape, and surface distance.

Example 3

Figure 5:
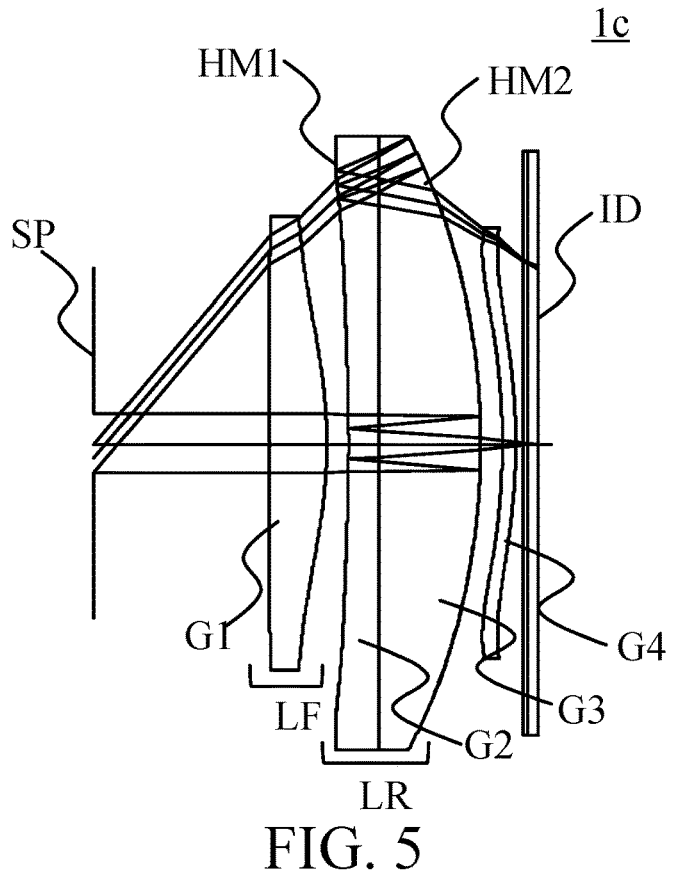
FIG. 5 is a sectional view of an optical system according to Example 3.
Figure 6:
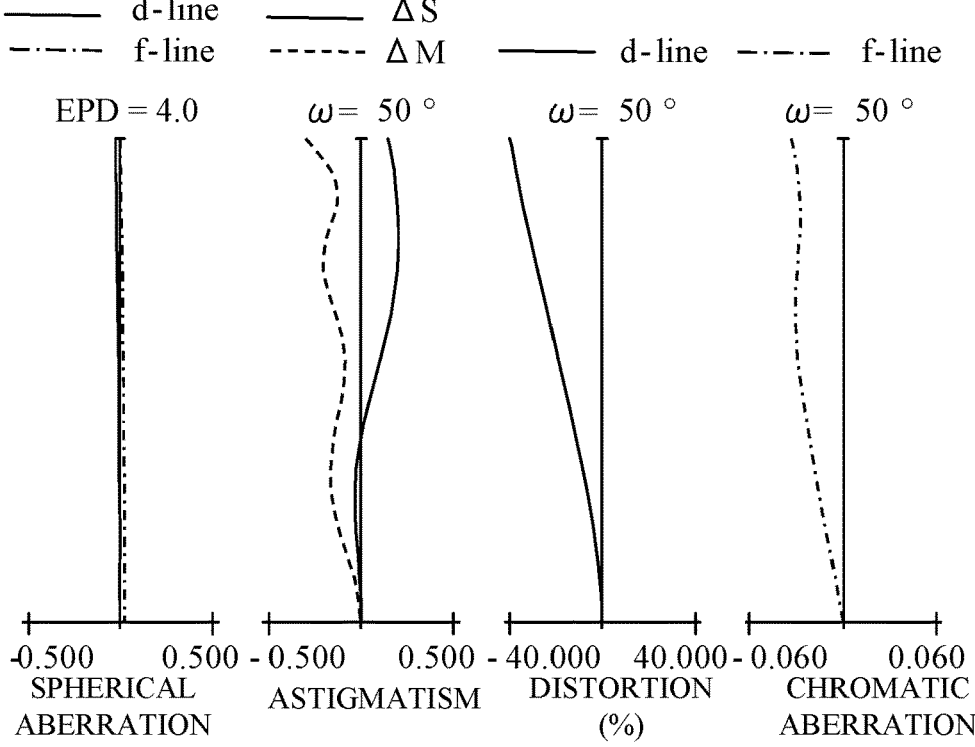
FIG. 6 is a longitudinal aberration diagram of the optical system according to Example 3.

Referring now to FIG. 5, a description will be given of an optical system 1c according to Example 3. In addition to the basic configuration of the optical system 1a according to Example 1, the optical system 1c includes a fourth lens G4 disposed between the rear group LR and the display surface ID. The bow-side fourth lens G4 having a concave surface facing the observation surface near the image display surface where the light rays converge can satisfactorily correct a curvature of field.

Example 4

Figure 7:
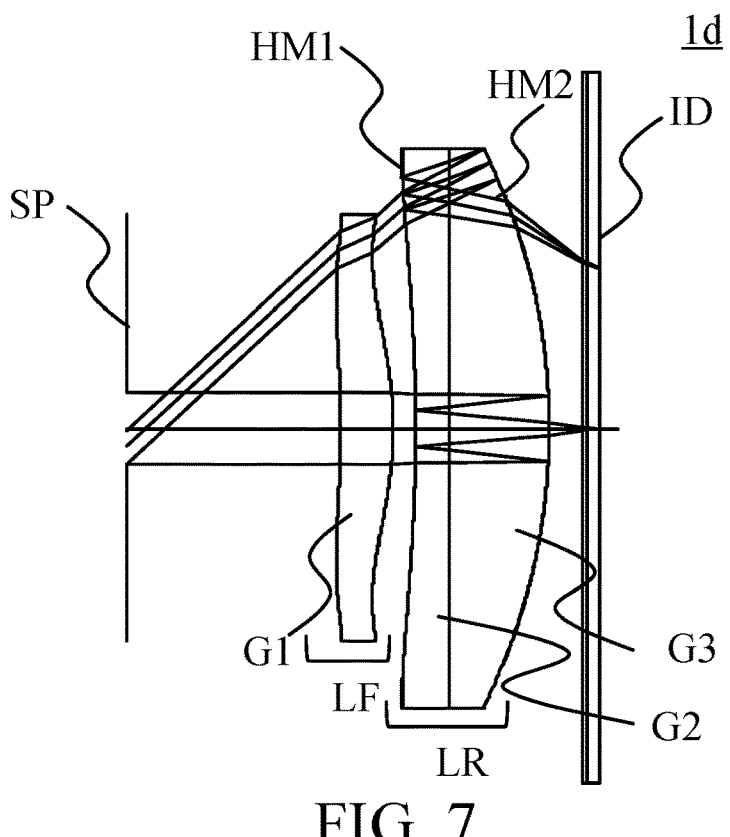
FIG. 7 is a sectional view of an optical system according to Example 4.
Figure 8:
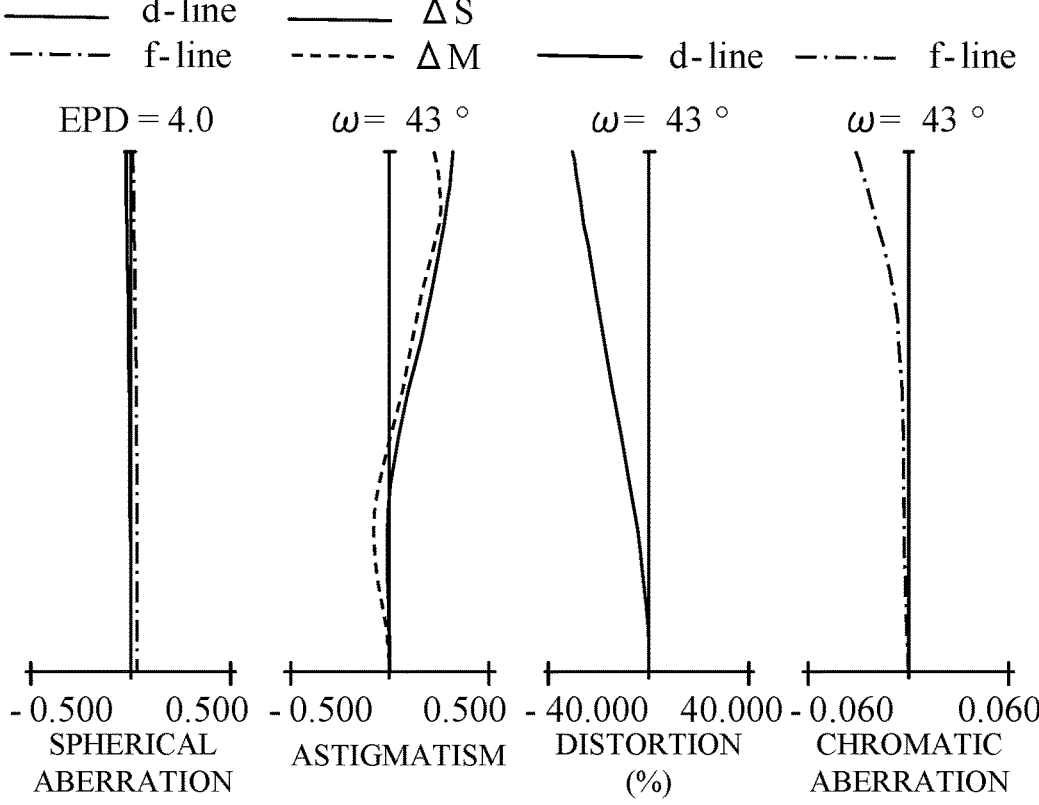
FIG. 8 is a longitudinal aberration diagram of the optical system according to Example 4.

Referring now to FIG. 7, a description will be given of an optical system 1d according to Example 4. The basic configuration of the optical system 1d is the same as that of the optical system 1a according to Example 1. In comparison with Example 1, this example can change the balance of each aberration, each lens shape, and surface distance.

Example 5

Figures 9, 10:
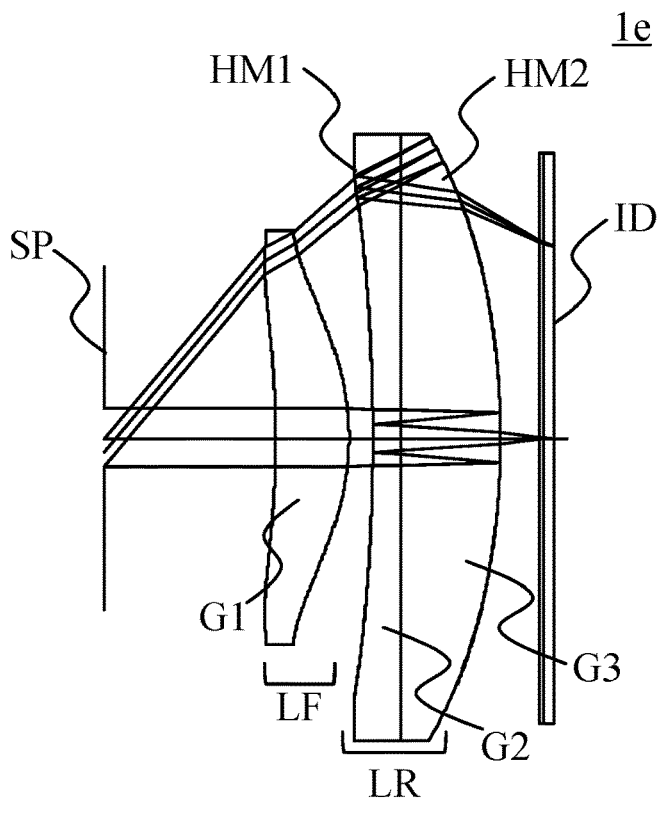
FIG. 9 is a sectional view of an optical system according to Example 5.
FIG. 10 is a longitudinal aberration diagram of the optical system according to Example 5.

Referring to FIG. 9, a description will be given of an optical system 1e according to Example 5. The basic configuration of the optical system 1e is the same as that of the optical system 1a according to Example 1. In comparison with Example 1, this example sets the overall angle of view to 85 degrees, and changes each lens shape and the surface distance.

Example 6

Figure 11:
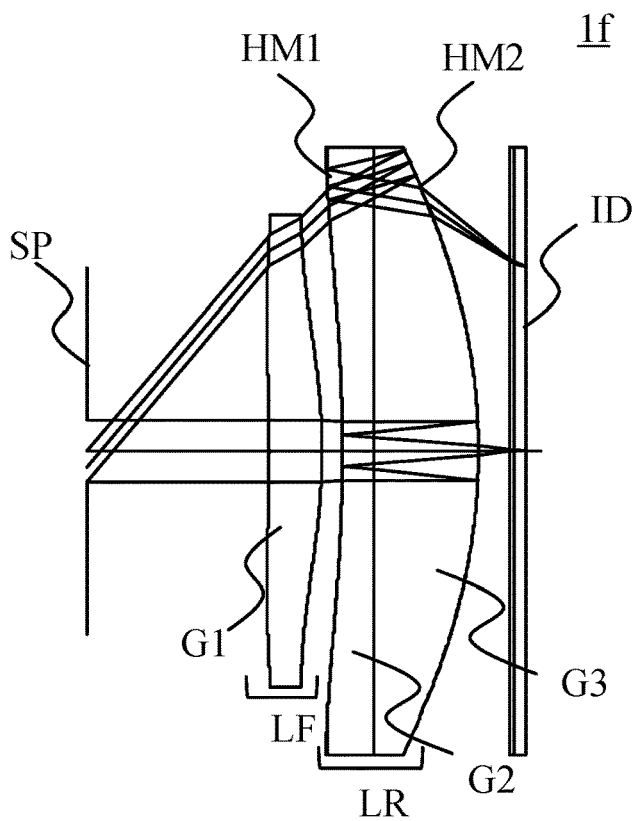
FIG. 11 is a sectional view of an optical system according to Example 6.
Figure 12:
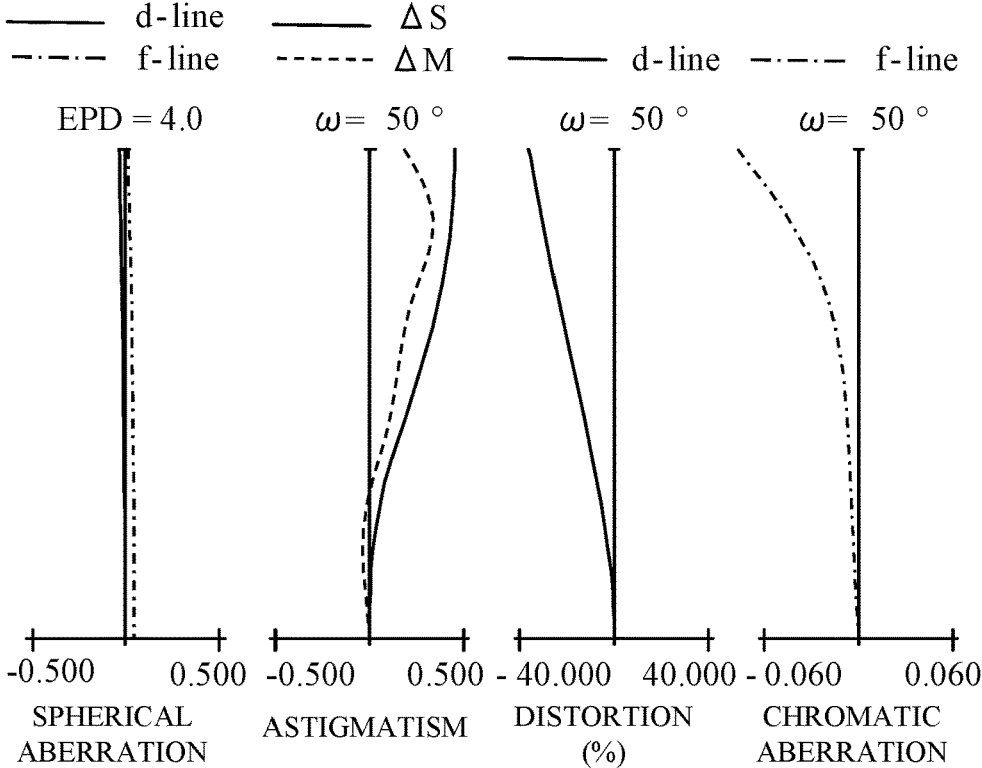
FIG. 12 is a longitudinal aberration diagram of the optical system according to Example 6.

Referring now to FIG. 11, a description will be given of an optical system 1f according to Example 6. The basic configuration of the optical system 1f is the same as that of the optical system 1a according to Example 1. In comparison with Example 1, this example changes the balance among aberrations, each lens shape, and the surface distance.

Example 7

Figures 13, 14:
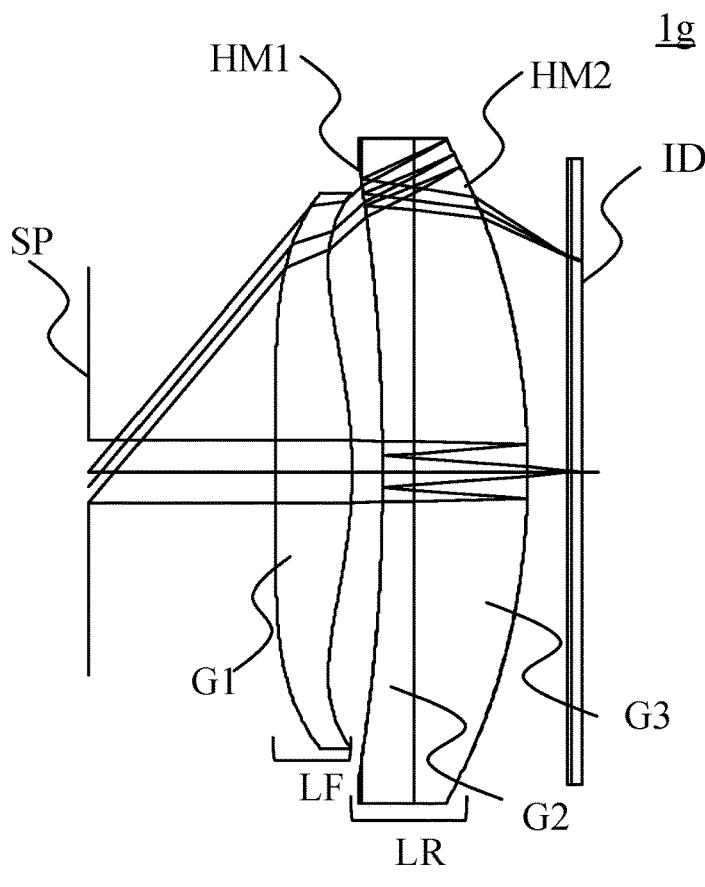
FIG. 13 is a sectional view of an optical system according to Example 7.
FIG. 14 is a longitudinal aberration diagram of the optical system according to Example 7.

Referring now to FIG. 13, a description will be given of an optical system 1g according to Example 7. The basic configuration of the optical system 1g is the same as that of the optical system 1a according to Example 1. In comparison with Example 1, this example increases a sag amount on the observation side surface of the first lens G1 in the positive direction, and changes each lens shape and the surface distance. Further increasing the substantial eye relief around the lens outer circumference can provide an observation optical system that has better visibility even for observers whose eyes are short relative to the optical system or whose eyelashes are long.

Example 8

Figures 15, 16:
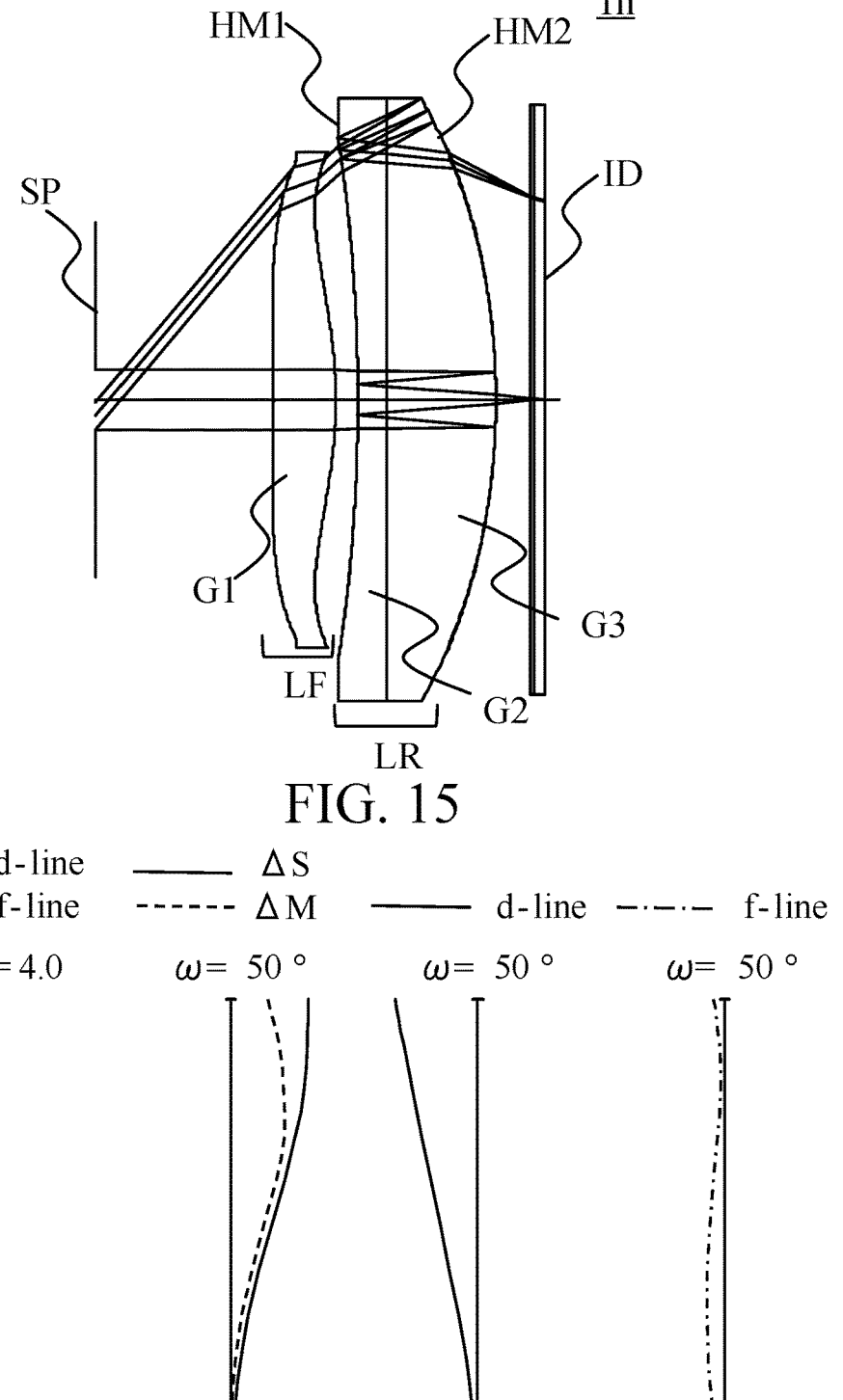
FIG. 15 is a sectional view of an optical system according to Example 8.
FIG. 16 is a longitudinal aberration diagram of the optical system according to Example 8.

Referring to FIG. 15, a description will be given of an optical system 1h according to Example 8. The basic configuration of the optical system 1h is the same as that of the optical system 1a according to Example 1. In comparison with Example 1, this example increases a sag amount of the surface on the observation side of the first lens G1 in the positive direction, and changes each lens shape and the surface distance. This further increases the substantial eye relief around the lens outer circumference.

Example 9

Figure 17:
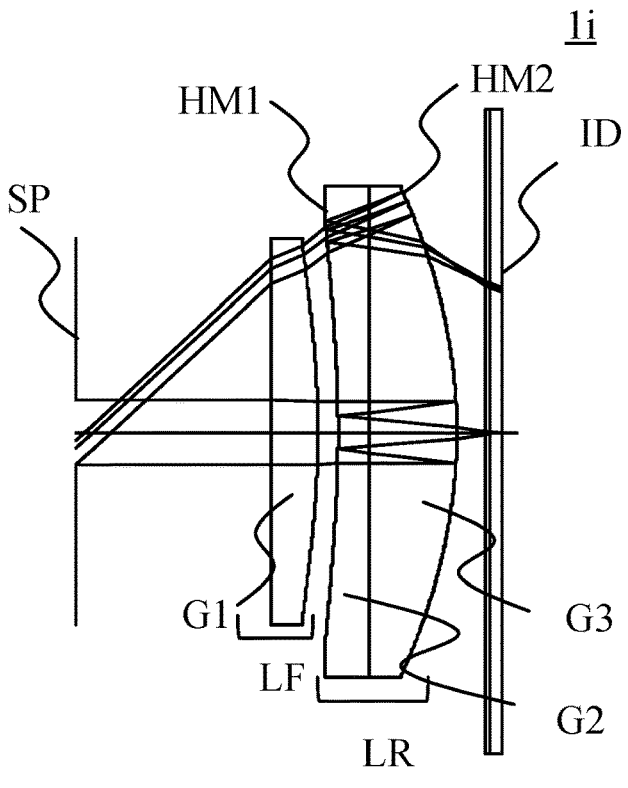
FIG. 17 is a sectional view of an optical system according to Example 9.
Figure 18:
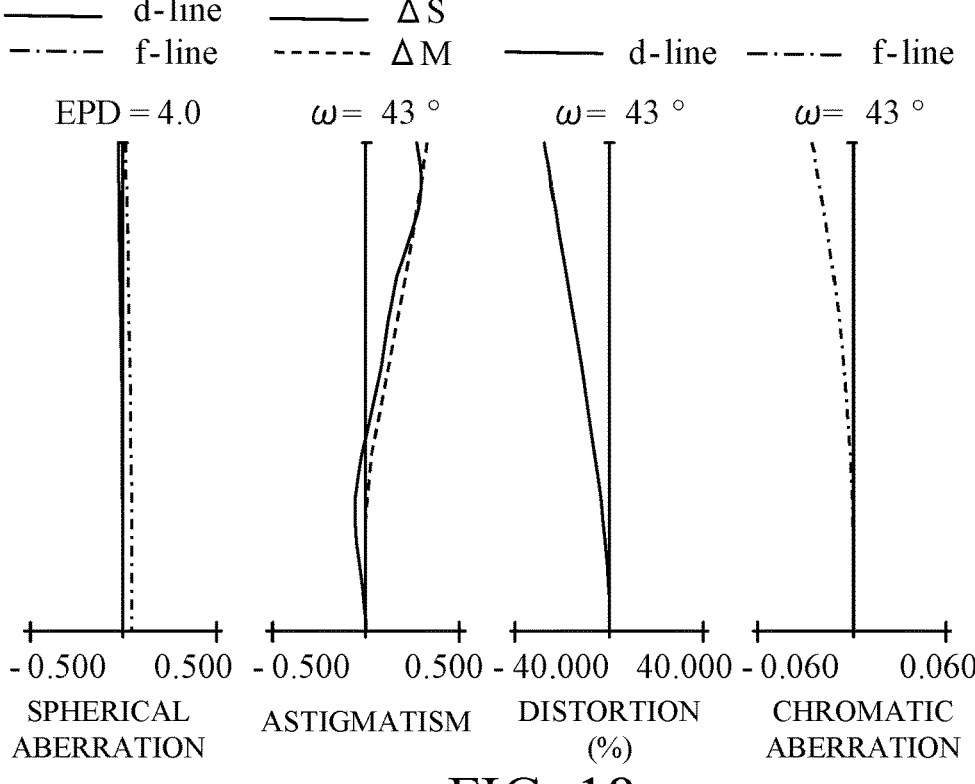
FIG. 18 is a longitudinal aberration diagram of the optical system according to Example 9.

Referring now to FIG. 17, a description will be given of an optical system 1i according to Example 9. The basic configuration of the optical system 1i is the same as that of the optical system 1a according to Example 1. In comparison with Example 1, this example sets an overall angle of view to 85 degrees, and changes each lens shape, the surface distance, and the material. For the material of the first lens G1, a molded glass material having a higher refractive index is used. Using the high refractive index for the positive lens can compensate for the large negative Petzval term generated at the second transmissive reflective surface HM2, and satisfactorily correct a curvature of field and astigmatism.

In case where the display element is combined with an electronic image display element, such as an LCD, each example may electronically process distortion and lateral chromatic aberration by applying various known methods.

A description will now be given of numerical examples 1 to 9 corresponding to Examples 1 to 9, respectively. A surface number i indicates an i-th surface when counted from the pupil surface side. r represents a radius of curvature of the i-th surface (mm), d represents a lens thickness or air gap (mm) between i-th and (i+1)-th surfaces, and nd represents a refractive index for the d-line of the material of the i-th optical member. νd represents an Abbe number of the material of the i-th optical element based on the d-line. The Abbe number νd of a certain material is expressed as follows:

$$vd = (Nd - 1)/(NF - NC),$$

where Nd, NF, and NC are refractive indices based on the d-line (587.6 nm), the F-line (486.1 nm), and the C-line (656.3 nm) in the Fraunhofer line, respectively. The effective diameter indicates a maximum diameter of an area through which light from an original image transmits on each surface.

In a case where the optical surface is aspherical, an asterisk * is attached to the right side of the surface number. The aspherical shape is expressed as follows:

$$x(h) = \frac{\left(\frac{h^2}{r}\right)}{1 + \sqrt{\left\{1 - (1 + k)\left(\frac{h}{r}\right)^2\right\}}} + A_4 h^4 + A_6 h^6 + A_8 h^8 + A_{10} h^{10} + \dots ,$$

where x is a displacement amount from a surface vertex in the optical axis direction, h is a height from the optical axis in a direction orthogonal to the optical axis, R is a paraxial radius of curvature, k is a conic constant, and A4, A6, A8, and A10 are aspheric coefficients.

Numerical Example 1

UNIT: mm

SURFACE DATA

| Surface No. | r | d | nd | vd | Effective Diameter |
|---|---|---|---|---|---|
| 1 (Aperture Stop) | ∞ | 12.00 | | | 4.00 |
| 2* | −151.109 | 4.31 | 1.54390 | 56.0 | 28.50 |
| 3* | −27.313 | 1.50 | | | 31.00 |
| 4* | −107.947 | 2.00 | 1.63550 | 23.9 | 35.50 |
| 5 | ∞ | 7.22 | 1.54390 | 56.0 | 39.00 |
| 6* | −45.218 | −7.22 | Reflective Surface | | 41.00 |
| 7 | ∞ | −2.00 | 1.63550 | 23.9 | 39.50 |
| 8* | −107.947 | 2.00 | Reflective Surface | | 36.50 |
| 9 | ∞ | 7.22 | 1.54390 | 56.0 | 35.50 |
| 10* | −45.218 | 1.50 | | | 33.50 |
| 11 | ∞ | 0.28 | 1.49170 | 57.4 | 40.00 |
| 12 | ∞ | 0.70 | 1.51680 | 64.2 | 40.00 |
| 13 | ∞ | 0.17 | | | 40.00 |
| Image Plane | ∞ | | | | |

ASPHERIC DATA

2nd Surface

K = 7.88306e+01 A 4 = 2.97929e−05 A 6 = −4.24361e−08

3nd Surface

K = −1.14677e+00 A 4 = 4.73405e−05 A 6 = −4.99317e−08

4th Surface

K = 0.00000e+00 A 4 = 4.88217e−06 A 6 = −9.25376e−09
A 8 = 1.27841e−11

-continued

UNIT: mm

6th Surface

K = −1.81462e+00 A 4 = −5.70626e−06 A 6 = 8.57608e−09
A 8 = −1.78867e−11 A10 = 2.26435e−14

8th Surface

K = 0.00000e+00 A 4 = 4.88217e−06 A 6 = −9.25376e−09
A 8 = 1.27841e−11 10th Surface K = −1.81462e+00 A 4 = −5.70626e−06 A 6 = 8.57608e−09
A 8 = −1.78867e−11 A10 = 2.26435e−14

| | |
|---|---|
| Focal Length | 16.50 |
| EPD | 4.0 |
| Half Angle of View | 50.0 |
| Overall Lens Length | 48.10 |
| Object Distance (from 1st Surface) | 1612.0 |

Single Lens Data

| Lens | Starting Surface | Focal Length |
|---|---|---|
| 1 | 1 | 60.55 |
| 2 | 4 | −169.86 |
| 3 | 5 | 83.14 |

| Group | Focal Length |
|---|---|
| Front Group | 60.55 |
| Rear Group | 20.14 |

Numerical Example 2

UNIT: mm
SURFACE DATA

| Surface No. | r | d | nd | vd | Effective Diameter |
|---|---|---|---|---|---|
| 1 (Aperture Stop) | ∞ | 11.92 | | | 4.00 |
| 2* | −445.168 | 4.07 | 1.54390 | 56.0 | 29.50 |
| 3* | −35.116 | 1.44 | | | 31.00 |
| 4* | −119.578 | 1.80 | 1.64220 | 22.4 | 36.00 |
| 5 | ∞ | 6.94 | 1.54390 | 56.0 | 39.50 |
| 6* | −44.490 | −6.94 | Reflective Surface | | 41.50 |
| 7 | ∞ | −1.80 | 1.63550 | 23.9 | 39.50 |
| 8* | −119.578 | 1.80 | Reflective Surface | | 36.50 |
| 9 | ∞ | 6.94 | 1.54390 | 56.0 | 35.00 |
| 10* | −44.490 | 2.21 | | | 33.50 |
| 11 | ∞ | 0.28 | 1.49170 | 57.4 | 40.00 |
| 12 | ∞ | 0.70 | 1.51680 | 64.2 | 40.00 |
| 13 | ∞ | 0.16 | | | 40.00 |
| Image Plane | ∞ | | | | |

ASPHERIC DATA

2nd Surface

K = 0.00000e+00 A 4 = 7.80932e−06 A 6 = 7.37852e−08
A 8 = −3.78172e−10

3nd Surface

K = 0.00000e+00 A 4 = 1.45774e−05 A 6 = 1.11869e−07
A 8 = −2.69617e−10

4th Surface

K = 0.00000e+00 A 4 = 1.86900e−05 A 6 = −6.89963e−08
A 8 = 7.29387e−11

-continued

| 6th Surface |
| --- |

K = −4.75832e+00 A 4 = −2.11175e−06 A 6 = 2.51659e−10
A 8 = −3.37729e−11 A10 = 3.69597e−14

| 8th Surface |
| --- |

K = 0.00000e+00 A 4 = 1.86900e−05 A 6 = −6.89963e−08
A 8 = 7.29387e−11

| 10th Surface |
| --- |

K = −4.75832e+00 A 4 = −2.11175e−06 A 6 = 2.51659e−10
A 8 = −3.37729e−11 A10 = 3.69597e−14

| | |
| --- | --- |
| Focal Length | 16.18 |
| EPD | 4.0 |
| Half Angle of View | 50.00 |
| Overall Lens Length | 47.00 |
| Object Distance (from 1st Surface) | 1612.0 |

| Single Lens Data | | |
| --- | --- | --- |
| Lens | Starting Surface | Focal Length |
| 1 | 1 | 69.85 |
| 2 | 4 | −186.20 |
| 3 | 5 | 81.80 |

| Group | Focal Length |
| --- | --- |
| Front Group | 69.85 |
| Rear Group | 18.92 |

Numerical Example 3

| UNIT: mm |
| --- |

| SURFACE DATA | | | | | |
| --- | --- | --- | --- | --- | --- |
| Surface No. | r | d | nd | vd | Effective Diameter |
| 1 (Aperture Stop) | ∞ | 12.00 | | | 4.00 |
| 2* | −175.262 | 3.91 | 1.54390 | 56.0 | 28.50 |
| 3* | −31.194 | 1.49 | | | 31.00 |
| 4* | −145.016 | 1.99 | 1.63550 | 23.9 | 36.50 |
| 5 | ∞ | 6.99 | 1.54390 | 56.0 | 39.50 |
| 6* | −48.540 | −6.99 | Reflective Surface | | 42.00 |
| 7 | ∞ | −1.99 | 1.63550 | 23.9 | 40.00 |
| 8* | −145.016 | 1.99 | Reflective Surface | | 37.50 |
| 9 | ∞ | 6.99 | 1.54390 | 56.0 | 36.50 |
| 10* | −48.540 | 1.49 | | | 35.00 |
| 11* | −49.616 | 1.00 | 1.63550 | 23.9 | 29.50 |
| 12* | −39.191 | 0.49 | | | 29.50 |
| 13 | ∞ | 0.28 | 1.49170 | 57.4 | 40.00 |
| 14 | ∞ | 0.70 | 1.51680 | 64.2 | 40.00 |
| 15 | ∞ | 0.18 | | | 40.00 |
| Image Plane | ∞ | | | | |

| ASPHERIC DATA |
| --- |

| 2nd Surface |
| --- |

K = −1.57270e−08 A 4 = 3.07205e−05 A 6 = −8.13134e−08

| 3nd Surface |
| --- |

K = 1.52928e−05 A 4 = 4.92423e−05 A 6 = −4.49062e−08

| 4th Surface |
| --- |

K = 0.00000e+00 A 4 = 1.26163e−05 A 6 = −4.43670e−08
A 8 = 4.69200e−11

-continued

| UNIT: mm |
| --- |

| 6th Surface |
| --- |

K = −2.47305e+00 A 4 = −1.96105e−06 A 6 = 3.01311e−09
A 8 = −3.12176e−11 A10 = 3.68950e−14

| 8th Surface |
| --- |

K = 0.00000e+00 A 4 = 1.26163e−05 A 6 = −4.43670e−08
A 8 = 4.69200e−11

| 10th Surface |
| --- |

K = −2.47305e+00 A 4 = −1.96105e−06 A 6 = 3.01311e−09
A 8 = −3.12176e−11 A10 = 3.68950e−14

| 11th Surface |
| --- |

K = 0.00000e+00 A 4 = −2.20776e−05 A 6 = 2.00306e−07

| 12th Surface |
| --- |

K = 0.00000e+00 A 4 = 1.79598e−05 A 6 = 8.39506e−08

| | |
| --- | --- |
| Focal Length | 16.87 |
| EPD | 4.0 |
| Half Angle of View | 50.00 |
| Overall Lens Length | 48.47 |
| Object Distance (from 1st Surface) | 1612.0 |

| Single Lens Data | | |
| --- | --- | --- |
| Lens | Starting Surface | Focal Length |
| 1 | 1 | 69.11 |
| 2 | 4 | −228.19 |
| 3 | 5 | 89.24 |
| 4 | 11 | 283.00 |

| Group | Focal Length |
| --- | --- |
| Front Group | 69.11 |
| Rear Group | 19.91 |

Numerical Example 4

| UNIT: mm |
| --- |

| SURFACE DATA | | | | | |
| --- | --- | --- | --- | --- | --- |
| Surface No. | r | d | nd | vd | Effective Diameter |
| 1 (Aperture Stop) | ∞ | 11.97 | | | 4.00 |
| 2* | −55.271 | 2.88 | 1.54390 | 56.0 | 22.50 |
| 3* | −20.721 | 1.32 | | | 24.00 |
| 4* | −84.272 | 1.87 | 1.64220 | 22.4 | 27.00 |
| 5 | ∞ | 5.60 | 1.54390 | 56.0 | 29.50 |
| 6* | −36.468 | −5.60 | | | 31.50 |
| 7 | ∞ | −1.87 | 1.63550 | 23.9 | 30.00 |
| 8* | −84.272 | 1.87 | | | 28.50 |
| 9 | ∞ | 5.60 | 1.54390 | 56.0 | 27.00 |
| 10* | −36.468 | 1.88 | | | 26.00 |
| 11 | ∞ | 0.28 | 1.49170 | 57.4 | 40.00 |
| 12 | ∞ | 0.70 | 1.51680 | 64.2 | 40.00 |
| 13 | ∞ | 0.12 | | | 40.00 |
| Image Plane | ∞ | | | | |

| ASPHERIC DATA |
| --- |

| 2nd Surface |
| --- |

K = 1.51770e+01 A 4 = 8.15201e−05 A 6 = 3.06446e−07
A 8 = −1.75980e−09

-continued

| UNIT: mm |
| --- |

| 3nd Surface |
| --- |

K = −2.94691e+00 A 4 = 9.18590e−05 A 6 = 3.98446e−07
A 8 = −2.23662e−09

| 4th Surface |
| --- |

K = 0.00000e+00 A 4 = 1.37710e−05 A 6 −−2.98165e−08
A 8 = 5.92974e−11

| 6th Surface |
| --- |

K = −2.97021e+00 A 4 = −1.41165e−05 A 6 = 3.35116e−08
A 8 = −9.59871e−11 A10 = 2.04861e−13

| 8th Surface |
| --- |

K = 0.00000e+00 A 4 = 1.37710e−05 A 6 = −2.98165e−08
A 8 = 5.92974e−11

| 10th Surface |
| --- |

K = −2.97021e+00 A 4 = −1.41165e−05 A 6 = 3.35116e−08
A 8 = −9.59871e−11 A10 = 2.04861e−13

| Focal Length | 13.81 |
| --- | --- |
| EPD | 4.0 |
| Half Angle of View | 43.00 |
| Overall Lens Length | 41.54 |
| Object Distance (from 1st Surface) | 1612.0 |

| Single Lens Data | | |
| --- | --- | --- |
| Lens | Starting Surface | Focal Length |
| 1 | 1 | 59.21 |
| 2 | 4 | −131.22 |
| 3 | 5 | 67.05 |

| Group | Focal Length |
| --- | --- |
| Front Group | 59.21 |
| Rear Group | 16.50 |

Numerical Example 5

| UNIT: mm | | | | |
| --- | --- | --- | --- | --- |
| SURFACE DATA | | | | |
| Surface No. | r | d | nd | vd | Effective Diameter |
| 1 (Aperture Stop) | ∞ | 12.00 | | | 4.00 |
| 2* | −65.917 | 5.13 | 1.54390 | 56.0 | 27.00 |
| 3* | −17.844 | 1.63 | | | 29.00 |
| 4* | −137.682 | 2.00 | 1.64220 | 22.4 | 36.50 |
| 5 | ∞ | 6.96 | 1.54390 | 56.0 | 40.00 |
| 6* | −57.743 | −6.96 | Reflective Surface | | 42.50 |
| 7 | ∞ | −2.00 | 1.63550 | 23.9 | 40.00 |
| 8* | −137.682 | 2.00 | Reflective Surface | | 37.00 |
| 9 | ∞ | 6.96 | 1.54390 | 56.0 | 36.00 |
| 10* | −57.743 | 2.75 | | | 34.50 |
| 11 | ∞ | 0.28 | 1.49170 | 57.4 | 40.00 |
| 12 | ∞ | 0.70 | 1.51680 | 64.2 | 40.00 |
| 13 | ∞ | 0.20 | | | 40.00 |
| Image Plane | ∞ | | | | |

| ASPHERIC DATA |
| --- |
| 2nd Surface |

K = 0.00000e+00 A 4 = 5.03940e−06 A 6 = 7.69655e−08
A 8 = 4.28621e−11

-continued

| UNIT: mm |
| --- |

| 3nd Surface |
| --- |

K = 0.00000e+00 A 4 = 5.40239e−05 A 6 = 1.24356e−08
A 8 = 5.63381e−10

| 4th Surface |
| --- |

K = 0.00000e+00 A 4 = 4.17695e−06 A 6 = −2.11046e−08
A 8 = 2.44773e−11

| 6th Surface |
| --- |

K = −9.62552e−01 A 4 = −5.57656e−06 A 6 = 6.04864e−09
A 8 = −1.82471e−11 A10 = 1.67931e−14

| 8th Surface |
| --- |

K = 0.00000e+00 A 4 = 4.17695e−06 A 6 = −2.11046e−08
A 8 = 2.44773e−11

| 10th Surface |
| --- |

K = −9.62552e−01 A 4 = −5.57656e−06 A 6 = 6.04864e−09
A 8 = −1.82471e−11 A10 = 1.67931e−14

| Focal Length | 18.00 |
| --- | --- |
| EPD | 4.0 |
| Half Angle of View | 50.00 |
| Overall Lens Length | 49.57 |
| Object Distance (from 1st Surface) | 1612.0 |

| Single Lens Data | | |
| --- | --- | --- |
| Lens | Starting Surface | Focal Length |
| 1 | 1 | 43.35 |
| 2 | 4 | −214.39 |
| 3 | 5 | 106.16 |

| Group | Focal Length |
| --- | --- |
| Front Group | 43.35 |
| Rear Group | 26.40 |

Numerical Example 6

| UNIT: mm | | | | |
| --- | --- | --- | --- | --- |
| SURFACE DATA | | | | |
| Surface No. | r | d | nd | vd | Effective Diameter |
| 1 (Aperture Stop) | ∞ | 11.99 | | | 4.00 |
| 2* | −113.850 | 3.41 | 1.54390 | 56.0 | 28.50 |
| 3* | −36.326 | 1.41 | | | 31.00 |
| 4* | −100.924 | 1.98 | 1.64220 | 22.4 | 34.50 |
| 5 | ∞ | 6.90 | 1.54390 | 56.0 | 37.50 |
| 6* | −40.583 | −6.90 | Reflective Surface | | 40.00 |
| 7 | ∞ | −1.98 | 1.63550 | 23.9 | 39.00 |
| 8* | −100.924 | 1.98 | Reflective Surface | | 37.50 |
| 9 | ∞ | 6.90 | 1.54390 | 56.0 | 36.00 |
| 10* | −40.583 | 2.11 | | | 35.00 |
| 11 | ∞ | 0.28 | 1.49170 | 57.4 | 40.00 |
| 12 | ∞ | 0.70 | 1.51680 | 64.2 | 40.00 |
| 13 | ∞ | 0.16 | | | 40.00 |
| Image Plane | ∞ | | | | |

| ASPHERIC DATA |
| --- |
| 2nd Surface |

K = 5.04511e+01 A 4 = 3.80577e−05 A 6 = −4.03137e−08
A 8 = 4.01686e−12

-continued

-continued

| UNIT: mm |
| --- |

3nd Surface

K = 2.84198e+00 A 4 = 5.29958e−05 A 6 = −1.49128e−08
A 8 = 7.60733e−13

4th Surface

K = 0.00000e+00 A 4 = 6.00631e−06 A 6 = −6.01424e−09
A 8 = 1.45176e−11

6th Surface

K = −2.26290e+00 A 4 = −5.04386e−06 A 6 = 8.94800e−09
A 8 = −1.96326e−11 A10 = 4.28929e−14

8th Surface

K = 0.00000e+00 A 4 = 6.00631e−06 A 6 = −6.01424e−09
A 8 = 1.45176e−11

10th Surface

K = −2.26290e+00 A 4 = −5.04386e−06 A 6 = 8.94800e−09
A 8 = −1.96326e−11 A10 = 4.28929e−14

| | |
| --- | --- |
| Focal Length | 15.78 |
| EPD | 4.0 |
| Half Angle of View | 50.00 |
| Overall Lens Length | 46.68 |

| Single Lens Data | | |
| --- | --- | --- |
| Lens | Starting Surface | Focal Length |
| 1 | 1 | 96.59 |
| 2 | 4 | −157.15 |
| 3 | 5 | 74.61 |

| Group | Focal Length |
| --- | --- |
| Front Group | 96.59 |
| Rear Group | 17.66 |

| UNIT: mm |
| --- |

3nd Surface

K = 0.00000e+00 A 4 = 3.05928e−05 A 6 = 8.63068e−08
A 8 = −4.39714e−11

4th Surface

K = 0.00000e+00 A 4 = −4.38270e−06 A 6 = 8.96199e−09
A 8 = −3.55185e−12

6th Surface

K = −1.60519e+00 A 4 = −5.12727e−06 A 6 = 1.24498e−09
A 8 = −5.86629e−13 A10 = 3.66282e−15

8th Surface

K = 0.00000e+00 A 4 = −4.38270e−06 A 6 = 8.96199e−09
A 8 = −3.55185e−12

10th Surface

K = −1.60519e+00 A 4 = −5.12727e−06 A 6 = 1.24498e−09
A 8 = −5.86629e−13 A10 = 3.66282e−15

| | |
| --- | --- |
| Focal Length | 17.48 |
| EPD | 4.0 |
| Half Angle of View | 50.00 |
| Overall Lens Length | 50.14 |
| Object Distance (from 1st Surface) | 1612.0 |

| Single Lens Data | | |
| --- | --- | --- |
| Lens | Starting Surface | Focal Length |
| 1 | 1 | 64.13 |
| 2 | 4 | −235.99 |
| 3 | 5 | 93.82 |

| Group | Focal Length |
| --- | --- |
| Front Group | 64.14 |
| Rear Group | 21.00 |

Numerical Example 7

| UNIT: mm | | | | |
| --- | --- | --- | --- | --- |

| SURFACE DATA | | | | |
| --- | --- | --- | --- | --- |

| Surface No. | r | d | nd | vd | Effective Diameter |
| --- | --- | --- | --- | --- | --- |
| 1 (Aperture Stop) | ∞ | 12.03 | | | 4.00 |
| 2* | −370.729 | 4.82 | 1.54390 | 56.0 | 35.50 |
| 3* | −32.029 | 1.97 | | | 35.50 |
| 4* | −151.553 | 2.00 | 1.64220 | 22.4 | 36.50 |
| 5 | ∞ | 7.23 | 1.54390 | 56.0 | 40.00 |
| 6* | −51.027 | −7.23 | Reflective Surface | | 42.50 |
| 7 | ∞ | −2.00 | 1.63550 | 23.9 | 42.50 |
| 8* | −151.553 | 2.00 | Reflective Surface | | 39.00 |
| 9 | ∞ | 7.23 | 1.54390 | 56.0 | 38.00 |
| 10* | −51.027 | 2.46 | | | 36.50 |
| 11 | ∞ | 0.28 | 1.49170 | 57.4 | 40.00 |
| 12 | ∞ | 0.70 | 1.51680 | 64.2 | 40.00 |
| 13 | ∞ | 0.19 | | | 40.00 |
| Image Plane | ∞ | | | | |

| ASPHERIC DATA | |
| --- | --- |

2nd Surface

K = 0.00000e+00 A 4 = 2.36803e−05 A 6 = 2.32963e−08
A 8 = 1.16836e−11

Numerical Example 8

| UNIT: mm | | | | |
| --- | --- | --- | --- | --- |

| SURFACE DATA | | | | |
| --- | --- | --- | --- | --- |

| Surface No. | r | d | nd | vd | Effective Diameter |
| --- | --- | --- | --- | --- | --- |
| 1 (Aperture Stop) | ∞ | 12.00 | | | 4.00 |
| 2* | −199.189 | 4.19 | 1.54390 | 56.0 | 32.50 |
| 3* | −32.761 | 1.51 | | | 33.50 |
| 4* | −130.058 | 2.00 | 1.64220 | 22.4 | 35.00 |
| 5 | ∞ | 7.34 | 1.54390 | 56.0 | 38.50 |
| 6* | −48.168 | −7.34 | Reflective Surface | | 41.00 |
| 7 | ∞ | −2.00 | 1.63550 | 23.9 | 39.00 |
| 8* | −130.058 | 2.00 | Reflective Surface | | 35.50 |
| 9 | ∞ | 7.34 | 1.54390 | 56.0 | 35.00 |
| 10* | −48.168 | 2.39 | | | 34.00 |
| 11 | ∞ | 0.28 | 1.49170 | 57.4 | 40.00 |
| 12 | ∞ | 0.70 | 1.51680 | 64.2 | 40.00 |
| 13 | ∞ | 0.19 | | | 40.00 |
| Image Plane | ∞ | | | | |

| ASPHERIC DATA | |
| --- | --- |

2nd Surface

K = 0.00000e+00 A 4 = 2.68904e−05 A 6 = 3.19929e−08
A 8 = −4.08384e−11

-continued

UNIT: mm

3nd Surface

K = 0.00000e+00 A 4 = 3.35497e−05 A 6 = 9.74570e−08
A 8 = −1.17162e−10

4th Surface

K = 0.00000e+00 A 4 = −3.09117e−06 A 6 = 5.97557e−09
A 8 = −2.90116e−12

6th Surface

K = −1.73753e+00 A 4 = −5.05188e−06 A 6−7.42470e−10
A 8 = 9.00847e−13 A10 = 6.86521e−17

8th Surface

K = 0.00000e+00 A 4 = −3.09117e−06 A 6 = 5.97557e−09
A 8 = −2.90116e−12

10th Surface

K = −1.73753e+00 A 4 = −5.05188e−06 A 6 = 7.42470e−10
A 8 = 9.00847e−13 A10 = 6.86521e−17

| | |
|---|---|
| Focal Length | 17.28 |
| EPD | 4.0 |
| Half Angle of View | 50.00 |
| Overall Lens Length | 49.28 |
| Object Distance (from 1st Surface) | 1612.0 |

Single Lens Data

| Lens | Starting Surface | Focal Length |
|---|---|---|
| 1 | 1 | 71.46 |
| 2 | 4 | −202.52 |
| 3 | 5 | 88.56 |

| Group | Focal Length |
|---|---|
| Front Group | 71.46 |
| Rear Group | 20.47 |

Numerical Example 9

UNIT: mm

SURFACE DATA

| Surface No. | r | d | nd | vd | Effective Diameter |
|---|---|---|---|---|---|
| 1 (Aperture Stop) | ∞ | 11.99 | | | 4.00 |
| 2 | ∞ | 2.94 | 1.69350 | 53.2 | 22.50 |
| 3* | −62.013 | 1.29 | | | 24.00 |
| 4* | −78.692 | 1.90 | 1.64220 | 22.4 | 26.50 |
| 5 | ∞ | 5.43 | 1.54390 | 56.0 | 29.00 |
| 6* | −32.868 | −5.43 | Reflective Surface | | 30.50 |
| 7 | ∞ | −1.90 | 1.63550 | 23.9 | 29.00 |
| 8* | −78.692 | 1.90 | Reflective Surface | | 27.00 |
| 9 | ∞ | 5.43 | 1.54390 | 56.0 | 26.00 |
| 10* | −32.868 | 1.77 | | | 24.50 |
| 11 | ∞ | 0.28 | 1.49170 | 57.4 | 40.00 |
| 12 | ∞ | 0.70 | 1.51680 | 64.2 | 40.00 |
| 13 | ∞ | 0.11 | | | 40.00 |
| Image Plane | ∞ | | | | |

ASPHERIC DATA

3nd Surface

K = 0.00000e+00 A 4 = 8.09921e−06 A 6 = −3.23812e−08
A 8 = 3.40485e−10

4th Surface

K = 0.00000e+00 A 4 = 1.94099e−05 A 6 = −7.06008e−08
A 8 = 1.41903e−10

6th Surface

K = −1.98138e+00 A 4 = −3.05062e−06 A 6 = 1.83085e−08
A 8 = −1.05677e−10 A10 = 2.13597e−13

8th Surface

K = 0.00000e+00 A 4 = 1.94099e−05 A 6 = −7.06008e−08
A 8 = 1.41903e−10

10th Surface

K = −1.98138e+00 A 4 = −3.05062e−06 A 6 = 1.83085e−08
A 8 = −1.05677e−10 A10 = 2.13597e−13

| | |
|---|---|
| Focal Length | 13.24 |
| EPD | 4.0 |
| Half Angle of View | 43.00 |
| Overall Lens Length | 41.07 |
| Object Distance (from 1st Surface) | 1612.0 |

Single Lens Data

| Lens | Starting Surface | Focal Length |
|---|---|---|
| 1 | 1 | 89.42 |
| 2 | 4 | −122.53 |
| 3 | 5 | 60.43 |

| Group | Focal Length |
|---|---|
| Front Group | 89.42 |
| Rear Group | 14.51 |

Table 1 summarizes values of each inequality in each numerical example.

| Inequality | Lower Limit | Upper Limit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| (1)SagR1LF | −0.1 | 0.2 | −0.01 | 0.01 | −0.01 | −0.02 | −0.04 | −0.01 | 0.17 | 0.10 | 0.00 |
| (2)Ff/F | 2 | 7 | 3.67 | 4.34 | 4.10 | 4.29 | 2.40 | 6.12 | 3.67 | 4.14 | 6.75 |
| (3)Fr1/F | −14 | −5 | −10.29 | −11.57 | −13.53 | −9.50 | −11.87 | −9.96 | −13.50 | −11.72 | 9.25 |
| (4)Ff/Fr | 1.2 | 6.5 | 3.01 | 3.69 | 3.47 | 3.59 | 1.64 | 5.47 | 3.05 | 3.49 | 6.16 |
| (5)Fr/F | 1 | 2 | 1.22 | 1.18 | 1.18 | 1.20 | 1.46 | 1.12 | 1.20 | 1.18 | 1.10 |
| (6)Fr1/Fr2 | −3 | −1.5 | −2.04 | −2.28 | −2.56 | −1.96 | −2.02 | −2.11 | −2.52 | −2.29 | 2.03 |
| (7)Fr2/F | 4 | 6 | 5.04 | 5.08 | 5.29 | 4.86 | 5.88 | 4.73 | 5.37 | 5.13 | 4.56 |
| (8)(R1LR − R2LR)/(R1LR + R2LR) | 0.1 | 1 | 0.41 | 0.46 | 0.50 | 0.40 | 0.41 | 0.43 | 0.50 | 0.46 | 0.41 |

While the disclosure has described example embodiments, it is to be understood that some embodiments are not limited to the disclosed embodiments. The scope of the following claims is to be accorded the broadest interpretation so as to encompass all such modifications and equivalent structures and functions.

For example, in a combination with a display element, such as an Organic Light Emitting Diode (OLED) or Liquid Crystal Display (LCD), electrical processing may be added to the display side depending on the distortion amount and the lateral chromatic aberration amount. In each example, one of the first transmissive reflective surface HM1 and the second transmissive reflective surface HM2 may be a polarization-selective transmissive reflective element (reflective polarizer) PBS. At this time, the other of the first transmissive reflective surface HM1 and the second transmissive reflective surface HM2 may be a half-mirror having a ratio of transmittance to reflectance of 1:1. The ratio between the transmittance and the reflectance may be changed, as necessary. In addition, the optical system according to each example includes three lenses, i.e., the first lens G1, the second lens G2, and the third lens G3, or four lenses further including the fourth lens G4 as a plurality of lenses, but is not limited to this configuration, and is applicable to an optical system that includes four or more lenses.

Each example can provide an optical system that has a wide field of view and high optical performance and can easily secure eye relief.

This application claims priority to Japanese Patent Application No. 2023-008489, which was filed on Jan. 24, 2023 and which is hereby incorporated by reference herein in its entirety.

What is claimed is:

1. An optical system configured to guide a light beam from a display surface to a pupil surface, the optical system comprising, in order from a pupil surface side to a display surface side:

a front group having a first lens having positive refractive power; and a rear group having a plurality of lenses, wherein a surface closest to the pupil surface of the rear group is a first transmissive reflective surface, and a surface closest to the display surface of the rear group is a second transmissive reflective surface, and wherein the following inequality is satisfied:

$$-0.10 < SagR1LF/F < 0.20,$$

where SagR1LF is a maximum sag amount of a surface on the pupil surface side of the first lens, and F is a focal length of the optical system.

2. The optical system according to claim 1, wherein the following inequality is satisfied:

$$2.0 < Ff/F < 7.0,$$

where Ff is a focal length of the front group.

3. The optical system according to claim 1, wherein the plurality of lenses include a second lens having negative refractive power, and the following inequality is satisfied:

$$-14.0 < Fr1/F < -5.0,$$

where Fr1 is a focal length of the second lens.

4. The optical system according to claim 1, wherein the following inequality is satisfied:

$$1.2 < Ff/Fr < 6.5,$$

where Ff is a focal length of the front group, and Fr is a focal length of the rear group.

5. The optical system according to claim 1, wherein the following inequality is satisfied:

$$1.00 < Fr/F < 2.00,$$

where Fr is a focal length of the rear group.

6. The optical system according to claim 1, wherein the plurality of lenses include a second lens having negative refractive power and a third lens having positive refractive power, and the following inequality is satisfied:

$$-3 < Fr1/Fr2 < -1.5,$$

where Fr1 is a focal length of the second lens, and Fr2 is a focal length of the third lens.

7. The optical system according to claim 1, wherein a surface on the display surface side of the first lens is an aspherical surface in which a curvature becomes gentler as a height from the optical axis increases.

8. The optical system according to claim 1, wherein the plurality of lenses include a set of lenses cemented to each other.

9. The optical system according to claim 1, wherein the plurality of lenses include a third lens having positive refractive power, and the following inequality is satisfied:

$$4.0 < Fr2/F < 6.0,$$

where Fr2 is a focal length of the third lens.

10. The optical system according to claim 1, wherein the following inequality is satisfied:

$$0.10 < (R1LR - R2LR)/(R1LR + R2LR) < 1.00,$$

where R1LR is a curvature of the surface closest to the pupil surface of the rear group, and R2LR is a curvature of the surface closest to the display surface of the rear group.

11. The optical system according to claim 1, wherein the plurality of lenses include a second lens and a third lens, and the following inequality is satisfied:

$$Vd1LR < Vd2LR,$$

where Vd1LR is an Abbe number of the second lens based on d-line, and Vd2LR is an Abbe number of the third lens based on the d-line.

12. The optical system according to claim 1, wherein the plurality of lenses include lenses made of a resin material.

13. The optical system according to claim 1, wherein the rear group further includes a quarter waveplate disposed between two of the plurality of lenses.

14. The optical system according to claim 1, wherein the plurality of lenses include a second lens and a third lens, and a surface on the display surface side of the second lens and a surface on the pupil surface side of the third lens are flat.

15. The optical system according to claim 1, wherein one of the first transmissive reflective surface and the second transmissive reflective surface is a polarizer configured to separate incident light into reflected light and transmitting light according to a polarization state.

16. The optical system according to claim 15, wherein the polarizer includes a plurality of convex portions made of metal or dielectric, and an array pitch of the plurality of convex portions is 200 nm or less.

17. A display apparatus comprising:

an optical system; and a display element including a display surface, wherein the optical system is configured to guide a light beam from the display surface to a pupil surface, the optical system comprising, in order from a pupil surface side to a display surface side:

a front group having a first lens having positive refractive power; and a rear group having a plurality of lenses, wherein a surface closest to the pupil surface of the rear group is a first transmissive reflective surface, and a surface closest to the display surface of the rear group is a second transmissive reflective surface, and wherein the following inequality is satisfied:

$$-0.10 < SagR1LF/F < 0.20,$$

where SagR1LF is a maximum sag amount of a surface on the pupil surface side of the first lens, and F is a focal length of the optical system.

\* \* \* \* \*